United States Patent [19]

Kasai et al.

[11] Patent Number: 4,736,353
[45] Date of Patent: Apr. 5, 1988

[54] DISC ACCESSING USING COARSE AND FINE ACTUATORS WITH THE FINE ACTUATOR LOCKED DURING COARSE ACTUATOR MOVEMENT

[75] Inventors: Masuo Kasai; Koji Muraoka, both of Hachioji, Japan

[73] Assignee: Hitachi Ltd., Japan

[21] Appl. No.: 828,353

[22] Filed: Feb. 11, 1986

[30] Foreign Application Priority Data

Mar. 20, 1985 [JP] Japan .................................. 60-54444

[51] Int. Cl.⁴ ...................... G11B 21/08; G11B 21/10; G11B 7/00
[52] U.S. Cl. ........................................ 369/32; 369/33; 369/41; 369/44; 360/78; 318/593
[58] Field of Search ...................... 360/77, 78; 369/30, 369/32, 33, 41, 43–46; 318/592, 593, 616, 617, 561; 358/907, 342; 250/202

[56] References Cited

U.S. PATENT DOCUMENTS

| | | | |
|---|---|---|---|
| 4,106,058 | 8/1978 | Romeas et al. | 369/32 |
| 4,562,562 | 12/1985 | Moriya et al. | 369/32 |
| 4,607,358 | 8/1986 | Maeda et al. | 369/44 |
| 4,613,963 | 9/1986 | Hirano | 369/44 |
| 4,615,023 | 9/1986 | Inada et al. | 369/32 |

Primary Examiner—Raymond F. Cardillo
Assistant Examiner—Steven R. Garland
Attorney, Agent, or Firm—Antonelli, Terry & Wands

[57] ABSTRACT

A method of accessing a rotary recording medium for positioning a head at a desired track on the rotary recording medium by using a coarse actuator and a fine actuator, comprising the steps of comparing an output signal produced from a detector for detecting movement of the fine actuator occurring immediately before initiation of an access operation of the coarse actuator with an output signal subsequently produced from the detector during the access operation of the coarse actuator to produce a comparison output signal, and locking the fine actuator at a state occurring immediately before the initiation of the access operation by driving the fine actuator on the basis of the comparison output signal to thereby suppress vibrations of the fine actuator due to translocations of the coarse actuator. An information memory apparatus utilizing the access method is also disclosed.

20 Claims, 2 Drawing Sheets

DISC ACCESSING USING COARSE AND FINE ACTUATORS WITH THE FINE ACTUATOR LOCKED DURING COARSE ACTUATOR MOVEMENT

BACKGROUND OF THE INVENTION

This invention relates to a method of accessing for retrieving a desired track from a number of tracks formed on a rotary recording medium and more particularly to an access method for positioning a light spot at the desired track by using a coarse actuator and a fine actuator, and to an information memory apparatus utilizing the access method.

An optical disc type memory apparatus has been developed as an information memory apparatus which can record/reproduce or erase as necessary, in a contactless manner, informatin on a rotary recording medium of high recording density. In such an optical disc type memory apparatus, a coarse actuator such as a linear motor cooperates with a fine actuator such as a galvanomirror to position a light beam (see Japanese Patent Unexamined Publication NO. 58-91536 corresponding to U.S. pat. application Ser. No. 443,399 filed Nov. 22, 1982 and Continuation Application therefrom Ser. No. 736,125 filed May 20, 1985), now U.S. Pat. No. 4,607,358 (Maeda et. al.). In an access operation with this optical type memory apparatus, a recording/reproducing optical head is first positioned to an approximate destination by using only the coarse actuator and thereafter, a light beam is positioned to a destined track by means of the fine actuator carried on the optical head. However, the fine actuator is dynamically freed during access operations of the coarse actuator and under high speed access operations of the coarse actuator, the fine actuator is subjected to so high an acceleration that it is deflected, with the result that at the termination of an access operation of the coarse actuator, the fine actuator continues to vibrate around a destination. This leads to a problem that a considerable amount of time is required for the fine actuator to position the light beam in the succeeding phase or the fine actuator fails to effect positioning. To solve this problem, it is conceivable to lock the fine actuator in a neutral position during the access operation of the coarse actuator by using a neutral detector operative to detect the neutral position of the fine actuator.

In order to confine within one track a vibration of the light spot due to a deflection of the fine actuator, a vibration angle $\theta$ of the mirror must be $$\theta < \frac{90 \, p}{\pi f},$$

where f represents a focal distance of an object and p a track pitch, indicating that the vibration angle is required to be a very small angle which is approximately $\theta < 0.01$ degree for practical apparatus. Locking of the mirror with this accuracy requires that the S/N ratio of a lock servo system be sufficiently large, resulting in necessity of a high gain neutral position detector capable of converting into a large signal an extremely slight angular displacement of the mirror from its neutral position. With this high gain neutral detector, such factors as temperature dependent change in the quantity of light from a light emitting element, a temperature dependent change in the dark current of a photodetector and a change in the reflection factor of the mirror due to aging cause the neutral position detection signal to DC drift to thereby prevent the mirror from being locked with high accuracies.

Moreover, a neutral position detector immune from such variations would be of a complicated structure

SUMMARY OF THE INVENTION

This invention contemplates elimination of the above problems and has for its object to provide a method of accessing a rotary recording medium which can use a simplified detector for detection of movements (represented by positions or angles) of a fine actuator to suppress vibrations of the fine actuator due to translocations of a coarse actuator with high accuracies and consequently can access the medium at high speeds under less influence of changes in characteristics of the detector due to DC drift and aging, and to provide an information memory apparatus utilizing the access method.

This invention is based on the fact that the vibrations of the fine actuator due to translocations of the coarse actuator can be suppressed if the fine actuator can be locked at a specified position or angle rather than the neutral position of the fine actuator and according to the invention, a detector is provided for detecting movements (positions or angles) of the fine actuator, and an output signal produced from the detector is held immediately prior to initiation of an access operation of the coarse actuator, and the held output signal is compared with an output signal subsequently produced from the detector during the access operation of the coarse actuator to lock the fine actuator at a state of position or angle occurring immediately prior to the initiation of the access operation of the coarse actuator. Even when characteristics of the detector change with DC drift and aging, which correspondingly causes the actual movement of the fine actuator to change, it is possible to lock the fine actuator at a state of position or angle occurring immediately before the access operatin under less influence of changes in the characteristics of the detector. Because an output signal of the detector held immediately before the initiation of an access operation contains the changes in correlation and this held output signal is compared with an output signal produced from the detector during the access operation of the coarse actuator, the changes in correlation therebetween can be cancelled out.

It should be understood that the locking position or angle may be changed for different access operations.

DESCRIPTION OF THE PREFERRED EMBODIMENT

Figure 1:
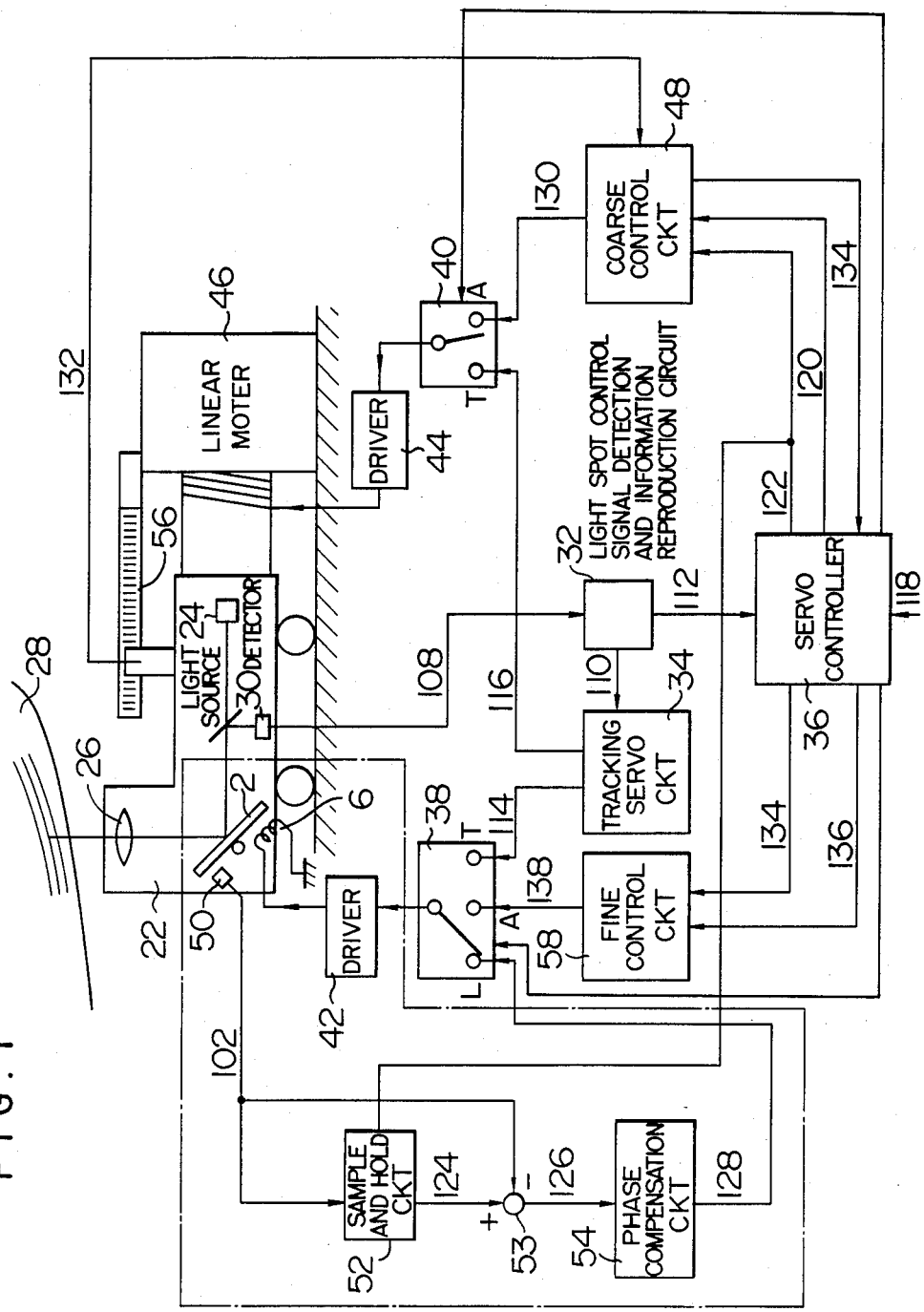
FIG. 1 is a block diagram showing an embodiment of the invention as applied to an optical disc type memory apparatus.

A preferred embodiment of the inventionn will now be described with reference to the accompanying drawings. In the embodiment, the invention is applied to an optical disc type memory apparatus wherein a linear motor operable to move the entirety of an optical head is used as a coarse actuator for coarse positioning over the entire radial area of a disc and a galvanomirror carried in the optical head is used as a high response fine actuator for fine positioning which follows a small local area, but this invention is in no way limited to such an embodiment.

A light beam emitted from a light source 24 carried on a recording/reproducing optical head 22 is reflected by a galvanomirror 2, focused by an objective lens 26 and projected onto a track (for example, a pre-groove or a train of pits) formed on an optical disc 28. A light beam reflected from the track is detected by a detector 30 and converted into electric signal 108 which in turn is supplied to a light spot control signal detection and information reproduction circuit 32. This circuit 32 decodes the electric signal 108 to produce a tracking error signal 110 and a data information signal 112. The optical head 22 is also mounted with a focusing detection optical system for detection of a focusing error signal, which system is not directly related to the present invention and will not be described herein. An example of the focusing detection optical system is disclosed in U.S. Pat. No. 4,450,547. Various methods for detection of the tracking error signal are known, of which a push-pull method using diffraction light as disclosed in, for example, U.S. Pat. No. 4,525,826 is preferable. The optical disc is rotatable about a rotary axis by means of a motor (not shown) and formed with a number of guide grooves which are spaced apart from each other in the radial direction and extend in the rotational direction. Each circle of the guide groove is divided into a plurality of sectors each having a header area in which a header signal containing an address for discrimination of each sector has been recorded, and a data area which is contiguous to the header area. The guide groove guides the light beam for recording/reproducing information on the data area or erasing the information. The optical disc 28 is comprised of a disc-like transparent substrate and a recording film formed on the substrate. The recording film is coated with a protective film as necessasry. Various kinds of recording film are used in accordance with types of recording. For example, a PbTeSe film is used for pit recording and a vertically magnetized film containing TbFe as a main constituent is used for magneto-optical recording.

The tracking error signal 110 is fed to a tracking servo circuit 34 and this circuit 34 generates a fine actuator tracking signal 114 and a coarse actuator tracking signal 116. At this time, a servo controller 36 renders a fine actuator drive mode switch 38 and a coarse actuator drive mode switch 40 transferred to their tracking terminals T. This permits the fine actuator tracking signal 114 drives a galvanomirror coil 6 via a fine actuator driver 42 to control an irradiation position of the light beam such that the light beam can follow a track while the coarse actuator tracking signal 116 drives a linear motor 46 via a coarse actuator driver 44 to move the recording/reproducing optical head 22 in the radial direction of the optical disc 28. This type of tracking is of a so-called two-stage tracking servo system which is disclosed in the aforementioned Japanese Patent Unexamined Publicatin No. 58-91536.

Under this tracking controlling, address information 118 concerning a destination to be accessed is sent from a controller of higher hierarchy to the servo controller 36 to start an access operation (seek controlling). Then, the servo controller 36 derives a current address from the data information 112 and computes a coarse access movement destination 120 which in turn is fed to a coarse access control circuit 48. The servo controller 36 also renders the fine actuator drive mode switch 38 transferred to a lock terminal L and concurrently renders the coarse actuator drive mode switch 40 transferred to an access terminal A. In FIG. 1, a dash-and-dotted line block represents a lock servo system for the fine actuator.

A deflection angle of the galvanomirror 2 is detected by a galvanomirror deflection angle detector 50 to provide a deflection angle signal 102. The galvanomirror deflection angle detector 50 is a light reflection type range detector and so, a deflection angle can be detected which depends upon a change in the quantity of reflection light in compliance with the deflection angle.

Figure 2:
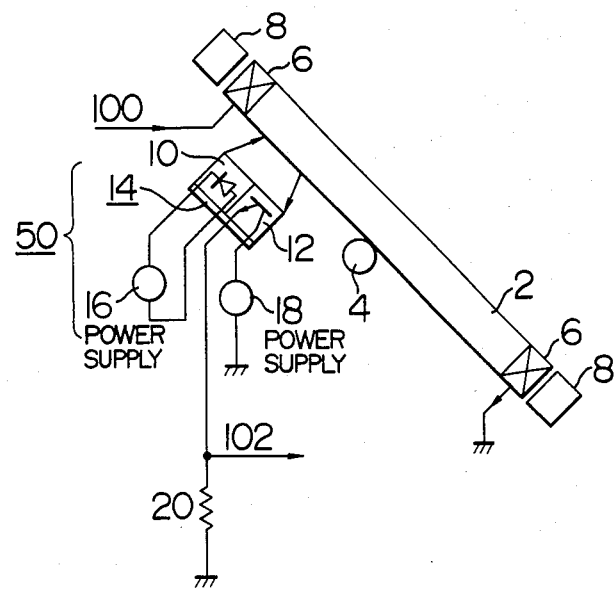
FIG. 2 is a diagram showing a galvanomirror deflection angle detector used in the FIG. 1 embodiment.

FIG. 2 shows a deflection angle detector 50 of a simplified construction. A galvanomirror 2 exemplified herein is so configured as to be deflected about a twisting center of a torsion bar 4 in accordance with an interaction force between a current 100 flowing through a coil 6 wound about the galvanomirror 2 and a stationary magnet 8. Fixedly disposed near the galvanomirror 2 is a detector 14 comprised of a set of light emitting diode 10 and photo-transistor 12. Light emitted from the light emitting diode 10 driven by a power supply 16 is reflected at the galvanomirror 2 and part of reflection light irradiates the phototransistor 12. The phototransistor 12 is driven by a power supply 18 and a signal voltage 102 corresponding to a quantity of incident light developed across a resistor 20. When the galvanomirror 2 is so deflected as to approach the detector 14, the quantity of light, emitted from the light emitting diode 10 and being incident to the phototransistor 12, increases to increase the signal voltage 102. Conversely, when the galvanomirror 2 is deflected to depart from the detector 14, the signal voltage 102 decreases. This means that the signal voltage 102 corresponds to the deflection angle of the galvanomirror 2. If a value of a particular signal voltage 102 produced when the galvanomirror 2 is in its neutral position is measured as an offset signal voltage in advance and the offset signal voltage is subtracted from a signal voltage 102 indicative of a galvanomirror deflection angle, a neutral position detection signal can be obtained which is zero when the galvanomirror 2 is in its neutral position and takes a position or negative value in accordance with a deflection of the galvanomirror 2.

With the simplified detector described as above, however, a temperature dependent change in the quantity of light from the light emitting diode 10, a temperature dependent change in the dark current of the phototransistor 12 and a change in the reflection factor of the galvanomirror 2 due to aging cause the neutral position detection signal not to be zero and to DC drift even when the galvanomirror 2 is in its neutral position.

Returning to FIG. 1, as soon as the servo controller 36 sends a coarse access initiation signal 122 to the coarse access control circuit 48, a particular galvanomirror deflection angle signal 102 responsive to the initiation is held by a sample and hold circuit 52 and this circuit produces a lock angle destination signal 124. A subsequently occurring galvanomirror deflection angle signal 102 is subtracted at a subtractor 53 from the lock angle destination signal 124 to provide a lock angle error signal 126 which in turn is fed to a phase compensation circuit 54. A fine actuator lock signal 128 output from the phase compensation circuit 54 energizes, via the fine actuator drive mode switch 38 and the fine actuator driver 42, the galvanomirror coil 6 in order to lock the galvanomirror 2.

Figure 3:
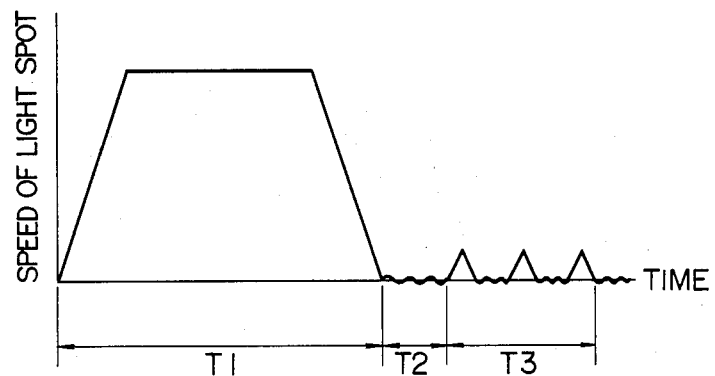
FIG. 3 is a graph for explaining a series of access operations in the FIG. 1 embodiment in relation to time.

An access signal 130 output from the coarse control circuit 48 energizes, via the coarse actuator drive mode switch 40 and coarse actuator driver 44, the linear motor 46 in order that the recording/reproducing optical head 22 is moved in the radial direction of the optical disc 28. A signal 132 indicative of a current coarse access position of the recording/reproducing optical head 22 is detected by a linear encoder 56 and fedback to the coarse access control circuit 48. Consequently, when a time T1 as shown in FIG. 3 has elapsed from the initiation of the coarse access, the light spot is positioned at a coarse access movement destination. Throughout an interval of the time T1, the galvanomirror 2 remains locked at a state of position (or angle) occurring immediately prior to the initiation of the coarse access.

When a coarse access end signal 134 is sent from the coarse access control circuit 48 to the servo controller 36 after lapse of the time T1, the servo controller 36 renders the fine actuator drive mode switch 38 and the coarse actuator drive mode switch 40 transferred to their tracking terminals T and the aforementioned two-stage tracking is restarted. Thus, during a time T2, the servo controller 36 reads a current track address out of data information 112, computes a fine access movement 138 representative of a difference between the current track address and the access destination address information 118, and sends the computed fine access movement 134 to a fine access control circuit 58. The servo controller 36 also renders the coarse actuator drive mode switch 40 transferred to its tracking terminal T and sends a fine access timing signal 136 to the fine access control circuit 58. During the generation of the fine access timing signal 136, the servo controller 36 repetitiously switches the fine actuator drive mode switch 38 between its access terminal A and tracking terminal T. The fine access control circuit 58 responds to the fine access timing signal 136 to produce a track jump pulse signal 138 when the fine actuator drive mode switch 38 is transferred to its access terminal A. The track jump pulse signal 38 energizes the galvanomirror coil 6 via the fine actuator driven 42 to move the galvanomirror 2 in such a manner that the light spot sweeps the track one by one or across a plurality of tracks. Where the fine access movement 134 corresponds to three tracks, fine access is performed during a time T3 as shown in FIG. 3.

Considering now the subject of the present invention directed to bringing the galvanomirror into a locked state over an interval of the coarse access time T1, the coarse access time T1 is much shorter then the time for characteristics of the galvanomirror deflection angle detector 50 to vary and therefore, the correlation between the actual galvanomirror deflection angle and the galvanomirror deflection angle signal 102 is substantially kept constant over the coarse access tie T1 to correctly lock the galvanomirror deflection angle at the particular deflection angle detected immediately before the initiation of the coarse access. Even when the characteristics of the galvanomirror deflection angle detector 50 vary and as a result the correlation between the actual galvanomirror deflection angle and the galvanomirror deflection angle signal 102 gradually changes, the lock angle destination signal 124 which output the change can in effect ensure correct locking of the galvanomirror deflection angle.

While in the foregoing embodiment the light spot is positioned by deflecting the angle of the galvanomirror, the invention may be applied to a case wherein a fine actuator operative to move the objective lens 26 in the access direction is used for positioning. Moreover, in the foregoing embodiment, the entire optical head 22 is moved by the linear motor 46 in the radial direction of the optical disc but only the objective lens 26 and galvanomirror 2 may be moved in the radial direction of the optical disc. Further, the invention has been described by way of the embodiment as applied to the optical disc type memory apparatus for illustrative purpose only but it may also be applicable to a magnetic memory apparatus of the type wherein a magnetic head is positioned at high speeds to a desired track on a magnetic disc by using a coarse actuator and a fine actuator.

As has been described, according to the invention, vibrations of the fine actuator occurring during the coarse access can be suppressed by means of the detector of simplifying construction to realize high speed access operations almost immune from changes in the detector characteristics due to DC drift and aging.

What is claimed is:

1. A method of accessing a rotary medium by positioning a head at a desired track on the rotary medium by using a coarse actuator and a fine actuator, comprising the steps of:
   comparing a first output signal produced from a detector for detecting movement of said fine actuator immediately prior to initiation of an access operation of said coarse actuator with a second signal subsequently produced from said detector during said access operation of said coarse actuator to produce a comparison output signal; and
   locking said fine actuator at a position occurring immediately prior to the initiation of said access operation on the basis of said comparison output signal during said access operation.

2. An access method according to claim 1, wherein an optical disc capable of at least one of recording or reproducing information using a light beam is used as said rotary medium, and said light beam is emitted from an optical head whose position is controlled by said coarse actuator and irradiated onto said optical disc such that the irradiation position of said light beam is controlled by said fine actuator carried in said optical head.

3. An access method according to claim 2, wherein said coarse actuator is a linear motor operable to move said optical head in a radial direction of said optical disc.

4. An access method according to claim 2, wherein said fine actuator comprises an actuator disposed in said optical head capable of moving an objective lens.

5. An access method according to claim 2, wherein said fine actuator is a movable mirror capable of deflecting said light beam in a radial direction of said optical disc.

6. An access method according to claim 5, wherein said detector detects deflection angles of said movable mirror.

7. An information memory accessing apparatus comprising:
   a rotary recording medium;
   a coarse actuator;
   a fine actuator;
   a head which is positioned at a desired track of said rotary recording medium by means of said coarse actuator and said fine actuator;

a detector for detecting movements of said fine actuator;

a lock signal generator for comparing a first output signal produced from said detector immediately prior to initiation of an access operation of said coarse actuator with a second output signal subsequently produced from said detector during the access operation of said coarse actuator to produce a comparison output signal; and means, responsive to said comparison output signal from said lock signal generator, for locking said fine actuator during the access operatin of said coarse actuator.

8. An information memory accessing apparatus according to claim 7, wherein said head is an optical head and said rotary recording medium comprises an optical disc capable of at least one of recording or reproducing information using a light beam, said coarse actuator comprises means for moving said optical head for irradiation of said light beam onto said optical disc in a radial direction of said optical disc, and said fine actuator comprises means, carried in said optical head, for controlling a radial irradiation position of said light beam on said optical disc.

9. An information memory accessing apparatus according to claim 8, wherein said coarse actuator is a linear motor.

10. An information memory accessing apparatus according to claim 8, wherein said fine actuator comprises means, disposed in said optical head, for moving an objective lens.

11. An information memory accessing apparatus according to claim 8, wherein a fine actuator is a movable mirror for deflection of said light beam.

12. An information memory accessing apparatus according to claim 11, wherein said detector detects deflection angles of said movable mirror.

13. An information memory accessing apparatus according to claim 12, wherein said detector comprises a light emitting element for irradiation of light only said movable mirror, and a light receiving element for receiving light from said movable mirror and for producing an output signal representative of a deflection angle of said movable mirror.

14. An information memory accessing apparatus according to claim 7, wherein said lock signal generator comprises first means responsive to an access initiation signal to sample and hold said first output signal produced from said detector, and second means for comparing said first output signal of said first means with said second output signal subsequently produced from said detector to produce a difference signal indicative of the comparison output signal.

15. An information memory accessing apparatus according to claim 14, wherein said lock signal generator further comprises third means, connected to said second means, for compensating for the phase of the difference signal of said second means.

16. An optical information memory accessing apparatus comprising:

a rotary recording medium capable of at least one of recording or reproducing information by using a light beam;

an optical head for irradiation of said light beam onto said rotary recording medium;

a first actuator for moving said optical head in a radial direction of said recording medium;

a second actuator, carried on said optical head, for controlling a radial irradiation position of said light beam on said rotary recording medium;

detector means for detecting movements of said second actuator;

lock signal generator means for comparing a first output signal produced from said detector means immediately prior to initiation of an access operation of said first actuator with a second output signal subsequently produced from said detector during the access operation of said first actuator to produce a comparison output signal and for generating on the basis of said comparison output signal a lock signal; and means, responsive to the lock signal from said lock signal generating means, for locking said second actuator at a state occurring immediately prior to the initiation of said access operation during said access operation of said first actuator.

17. An optical information memory accessing apparatus according to claim 16, wherein said first actuator is a linear motor and said second actuator is a movable mirror for deflection of said light beam.

18. An optical information memory accessing apparatus according to claim 17, wherein said detector means is a deflection angle detector comprising a light emitting element for irradiation of light onto said movable mirror and a light receiving element for receiving light from said movable mirror and for producing an output signal representative of a deflection angle of said movable mirror.

19. An optical information memory accessing apparatus according to claim 16, wherein said lock signal generator means comprises a sample and hold circuit connected to said detector means and controlled by an access initiation signal, and a differential circuit connected to said detector means and said sample and hold circuit for producing a difference between said first and second output signals.

20. An optical information memory accessing apparatus according to claim 19, wherein said lock signal generator means further comprises a phase compensation circuit connected to said differential circuit.

* * * * *